INVENTOR.
PHILIP D. COREY
BY Isidore Match
ATTORNEY

April 26, 1966 P. D. COREY 3,248,635

FREQUENCY CONVERTER

Filed July 17, 1961 6 Sheets-Sheet 2

INVENTOR.
PHILIP D. COREY

BY Isidore Match

ATTORNEY

INVENTOR.
PHILIP D. COREY
BY Isidore Match
ATTORNEY

April 26, 1966 P. D. COREY 3,248,635

FREQUENCY CONVERTER

Filed July 17, 1961 6 Sheets-Sheet 4

INVENTOR.
PHILIP D. COREY
BY Isidore Match
ATTORNEY

INVENTOR
PHILIP D. COREY
BY Isidore Match
ATTORNEY

INVENTOR.
PHILIP D. COREY
BY Isidore Match
ATTORNEY

United States Patent Office 3,248,635
Patented Apr. 26, 1966

3,248,635
FREQUENCY CONVERTER

Philip D. Corey, Waynesboro, Va., assignor to General Electric Company, a corporation of New York
Filed July 17, 1961, Ser. No. 124,467
25 Claims. (Cl. 321—4)

This invention relates to frequency converters. More particularly, it relates to a system for converting a polyphase power input of one frequency to a single phase power output of a different frequency.

At present, the systems that are utilized for frequency conversion of polyphase power inputs of one frequency to a single phase power output of a different frequency essentially employ rotary equipment containing mechanical parts. Such rotary equipment is expensive, quite bulky and heavy, requires constant maintenance, and does not afford a sufficient degree of reliability.

Accordingly, it is an important object of this invention to provide a system for converting a polyphase power input thereto of one frequency to a single phase power output of a different frequency, such system being static, i.e., containing substantially no moving parts.

It is a further object to provide a system in accordance with the preceding object which is of much lighter weight than heretofore known similar type equipments, and which is highly reliable.

It is another object of the invention to provide a frequency converter in accordance with the preceding objects which has a high tolerance to input voltage transients, has highly reliable operation at a wide range of operating temperatures, and is relatively simple in circuit arrangement.

Generally speaking and in accordance with the invention, there is provided a combination adapted to be coupled to an alternating current potential source having a plurality of balanced phase outputs, each of the outputs having a voltage and a frequency which may be randomly variable comprising means adapted to be connected in circuit with the polyphase source for rectifying its outputs, an oscillator having a chosen frequency, and a power inverter. There are further included means for applying the output of the oscillator and the output of the rectifying means to the power inverter to produce a single phase power output having the oscillator frequency. A source of reference potential of a chosen value is provided and such reference potential is compared with the output voltage from the power inverter, the voltage resulting from such comparison being applied as a correction voltage to the power inverter to regulate the voltage of the system output.

A feature of the invention resides in the use of silicon controlled rectifiers as the switching elements in the power inverter.

Another feature of the invention resides in the rectifying of the polyphase input, inverting the unidirectional potential produced by such rectifying to an A.C. output, and regulating the voltage of the A.C. output. The oscillator in the system is suitably chosen to be of the square wave output type whereby the output of the inverter is a quasi square wave.

In one illustrative embodiment of the invention, a feature resides in the use of a master square wave oscillator and a slave square wave oscillator having identical outputs but which are displaced in phase in accordance with the magnitude of the correction voltage. The power inverter of this embodiment also comprises separate respective inverters whose outputs are controlled by the master and slave oscillators respectively whereby their outputs are also displaced in phase in accordance with the magnitude of the correction voltage. The outputs of the inverters comprising the power inverter are combined by phasor addition, and such output voltage is then compared with the reference voltage.

In another illustrative embodiment of the invention, a feature resides in directly varying the conduction intervals of the switching devices in the power inverter to provide voltage regulation of the output of the system.

The novel features, which are believed to be characteristic of this invention, are set forth with particularity in the appended claims. The invention itself, however, both as to organization and method of operation together with further objects and advantages thereof, may best be understood by reference to the following description when taken in connection with the accompanying drawings.

In the drawings, FIG. 1 is a block diagram of an embodiment of a frequency converter according to the invention;

FIGS. 2 and 3 taken together as in FIG. 4 is a schematic depiction of the frequency converter shown in block form FIG. 1;

Figures 2, 4:
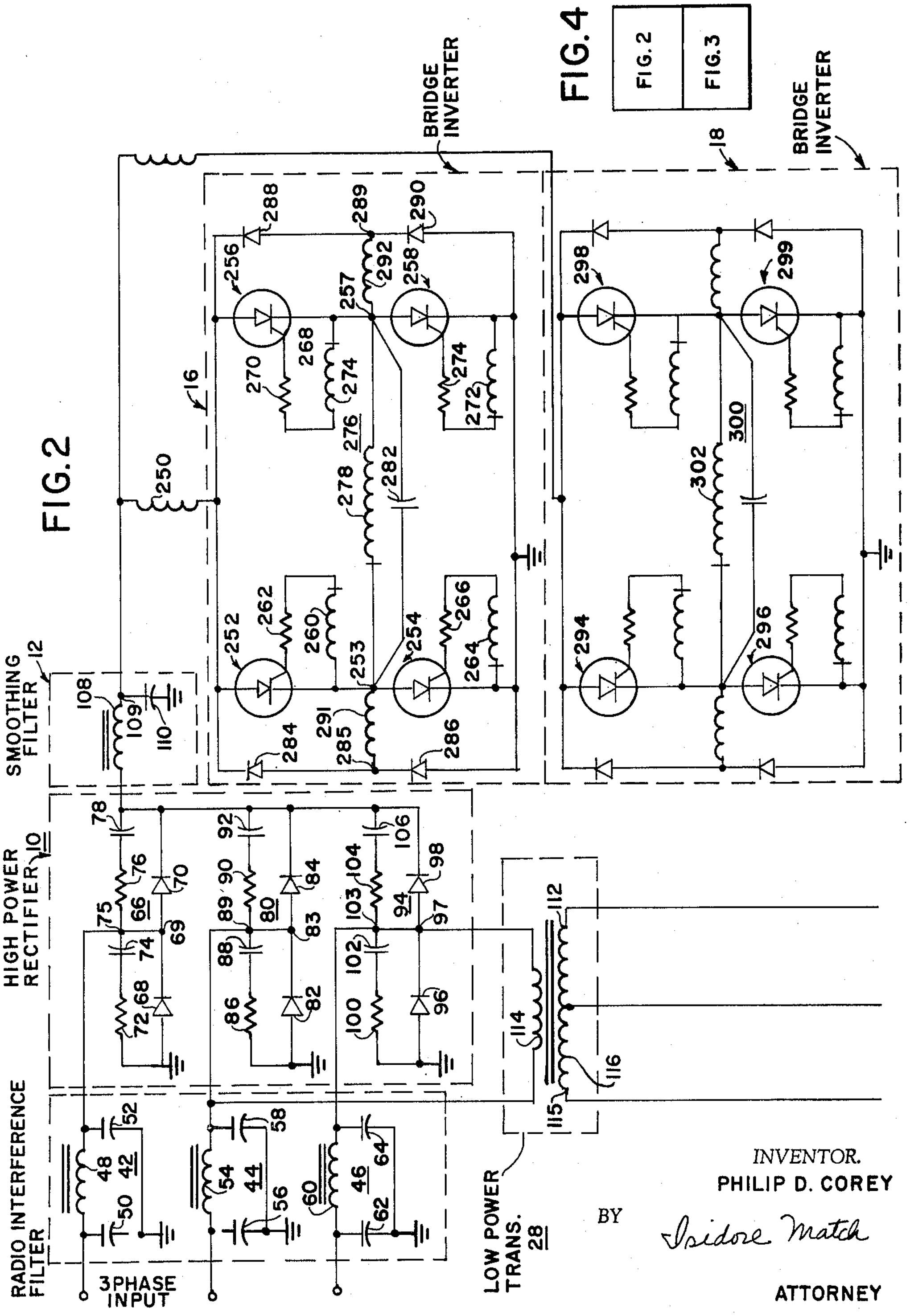
Figure 3:
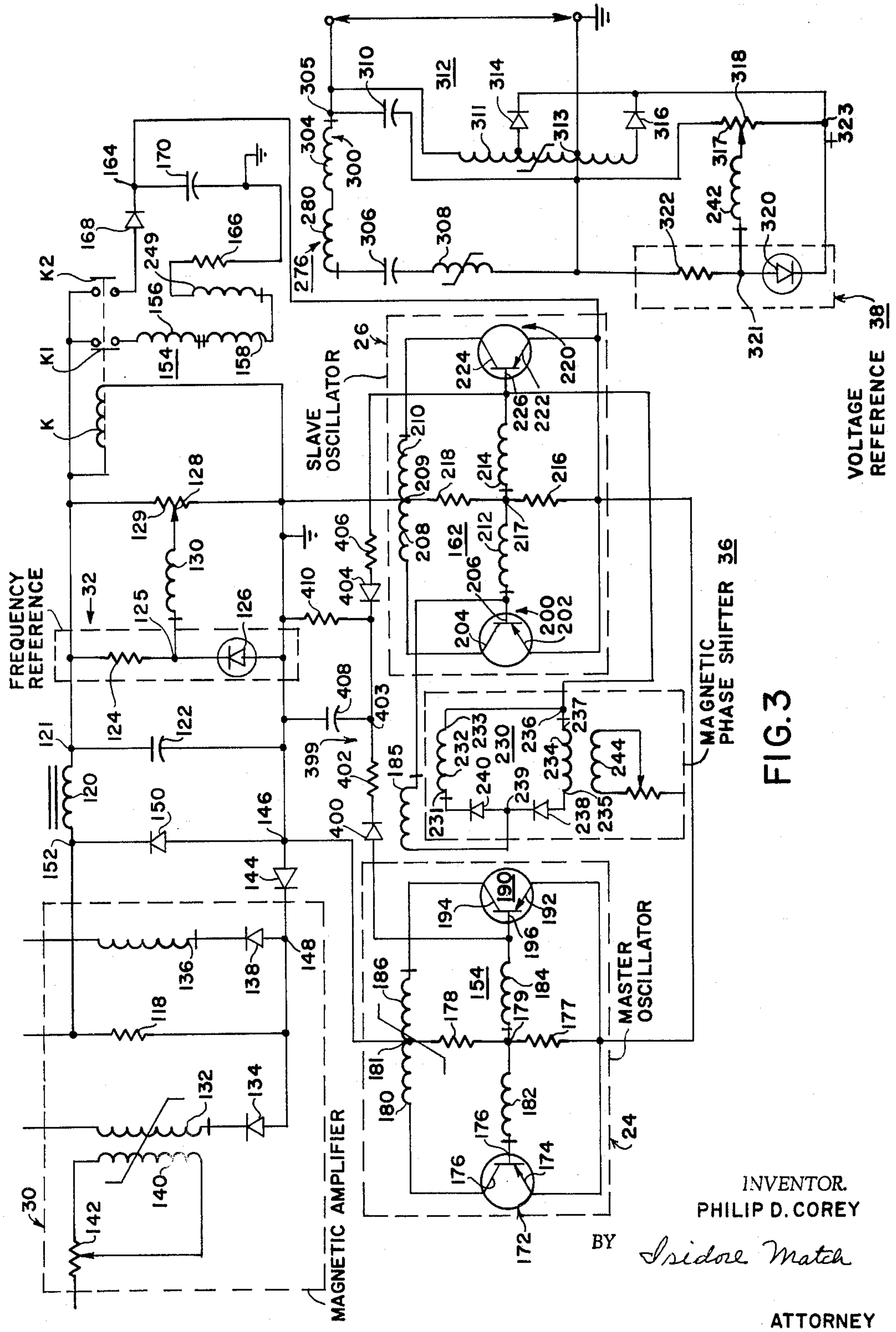
Figure 7:
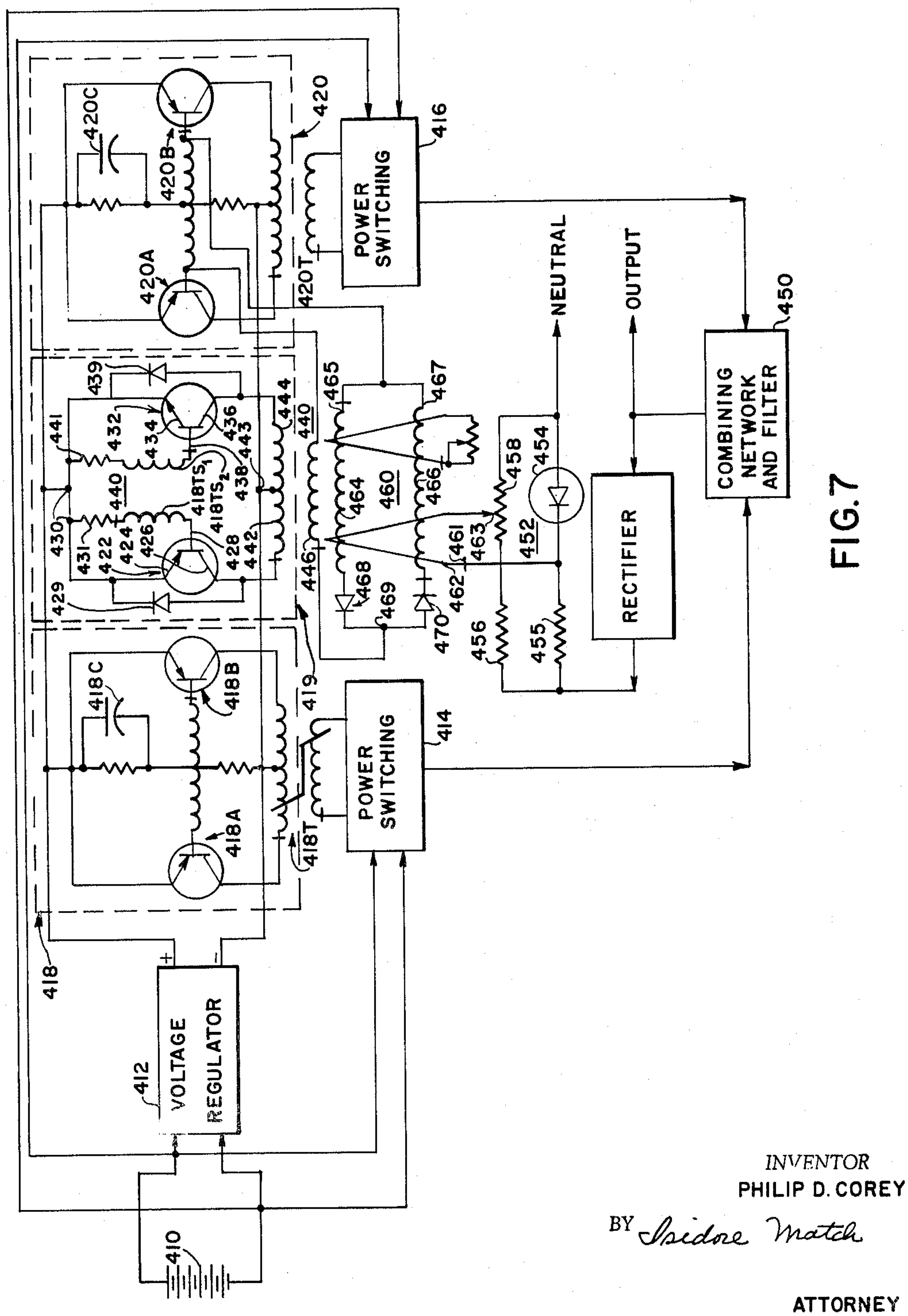
Figure 8:
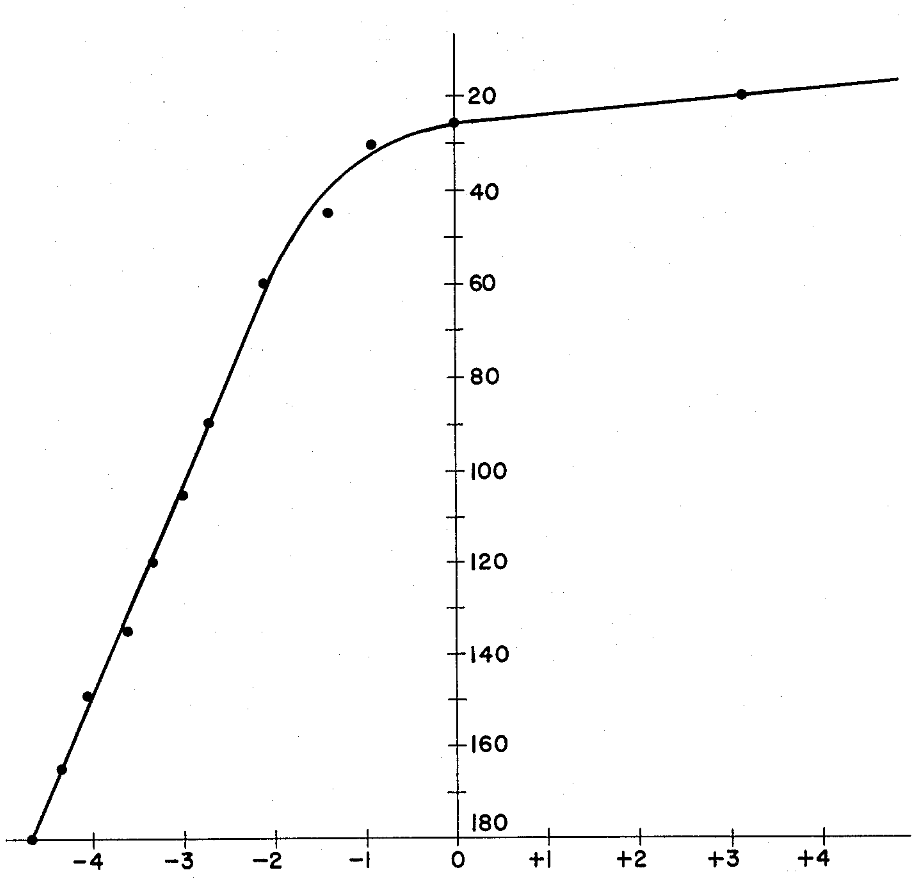

FIG. 7 is a diagram partly in block form and partly schematic of an embodiment of a master-slave oscillator combination utilized to regulate the output voltage resulting from the combining of the outputs of a plurality of power inverters; and FIG. 8 is a graph which shows the advantageous smoothness of phase shift provided by such master-slave oscillator combination, the data for such graph being obtained from the operation of the master-slave oscillator combination in the circuit of FIGS. 2–4.

Figure 1:
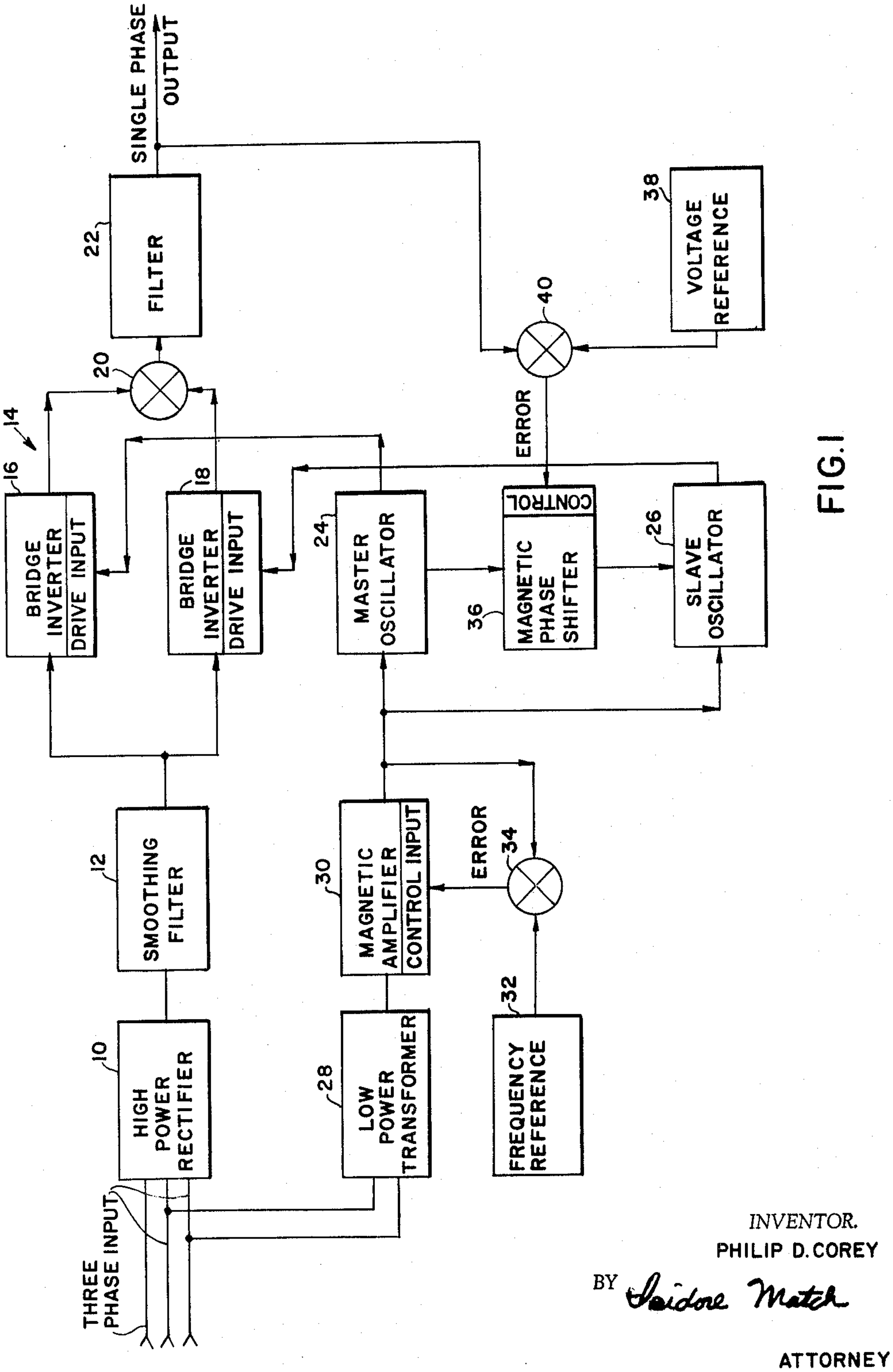

Referring now to FIG. 1, a multiple balanced phase input shown for convenience as comprising three phases and which may have a randomly variable voltage and frequency is passed through a high power rectifier 10 to provide a full wave combined rectified output of the polyphase input. Rectifier 10 may suitably be a three phase "double way" rectifier. The output of rectifier 10 is passed through a D.C. smoothing filter 12 to smooth the output of rectifier 12 and thereby to eliminate voltage modulation of the output of the system. Filter 12 may suitably be of the well known LC choke filter type, the LC ratio therein being chosen to be of a small value to minimize voltage transients due to step changes in the load of the output of the system.

The smooth but unregulated output from filter 12 which is a unidirectional potential, suitably of about 250 volts, is applied to the power inverter stage 14. Stage 14 comprises two identical bridge inverters 16 and 18 which produce square wave power outputs of a chosen frequency in response to the concurrent application thereto of the unidirectional input from filter 12 and a square wave voltage having such chosen frequency. The inverters 16 and 18 contain power switching devices which are suitably silicon controlled rectifiers. Inverters 16 and 18 may include output transformers, the secondary windings of which are connected in series so that the total output of the inverter stage 14 is the phasor sum of the outputs on the windings which are so connected in series. Such phasor addition is conceptually depicted as being effected in combining stage 20.

The total output of power inverter stage 14 is filtered in a filter stage 22, filter stage 22 preferably being a so-called "fourth order" type filter. The latter type filter may comprise a series resonant inductor and capacitor in series arrangement with the output of the power inverter stage 14 and a parallel resonant inductor and capacitor connected directly across the terminals of power inverter stage 14, the inductor-capacitor circuits being tuned to the frequency of the oscillators. The inductor in the series resonant portion of filter stage 22 may be chosen to be of saturable type and having a volt-second characteristic wherein it saturates at overload current. The use of such saturable series connected inductor serves to automatically increase the impedance of the series connected resonant circuit in filter stage 22 and thereby limits the output current of the system to a safe value. Filter stage 22 is preferably designed so that over a prescribed load and power factor range, the total harmonic content in the output of the system does not exceed a small percentage such as about 5 percent.

The square wave voltage inputs to bridge inverters 16 and 18 respectively which determine the frequency of the output of the system are produced in master oscillator 24 and slave oscillator 26. Oscillators 24 and 26 conveniently may be magnetic coupled multivibrators whose frequencies are functions respectively of the D.C. supply voltage applied thereto. Such supply voltage is preferably closely regulated to maintain the output frequencies of oscillators 24 and 26 within close tolerances.

To provide a regulated voltage supply for oscillators 24 and 26, a portion of the polyphase input to the system is passed through a low power transformer 28. The outputs of transformer 28 are applied to the gate windings of a relatively high gain self-saturating magnetic amplifier 30, i.e., an "amplistat." A control winding in magnetic amplifier 30 has applied thereto a D.C. voltage such that the value of the output voltage of magnetic amplifier 30 is the desired regulated D.C. supply voltage for oscillators 24 and 26.

In this connection, the voltage supply for oscillators 24 and 26 is compared with the output of a reference voltage source 32, there suitably being developed in stage 32, the proper voltage across a reference diode such as a Zener diode. The supply voltage for oscillators 24 and 26 and the voltage from source 32 are compared, such comparison being depicted conceptually as being effected in element 34 and the difference therebetween is the aforesaid D.C. voltage which is applied as the correction voltage to the control winding of magnetic amplifier 30. The correction voltage is applied to the control winding in such polarity whereby the output of magnetic amplifier is either increased or decreased as is necessary to maintain the supply voltage for oscillators 24 and 26 at the desired regulated level. The D.C. input to oscillators 24 and 26 may suitably be about 15 volts.

The output of master oscillator 24 is applied as a driving input to bridge inverter 16 and is a square wave voltage which determines the output frequency of bridge inverter 16. The output of master oscillator 24 is also applied as an input to slave oscillator 26 through a magnetic phase shifter stage 36. Slave oscillator 26 is suitably a circuit similar to master oscillator 24 and magnetic phase shifter 36 may be a coupling between oscillators 24 and 26 such as a saturable inductor or a magnetic amplifier which has a chosen volt-second characteristic whereby the output of slave oscillator 26 is displaced in phase with respect to the output of master oscillator 24 an adjustable amount, such amount being in accordance with the value of the voltage applied to magnetic phase shifter 36 and its volt-second characteristic. The output from slave oscillator 26 drives bridge inverter 18 whereby the output of bridge inverter 18 lags the output of bridge inverter 16 the same amount as the output of the slave oscillator 26 lags the output of master oscillator 24.

In the system of FIG. 1, the output voltage may be sensed by rectifying the output of filter 22 to obtain a unidirectional voltage whose value is proportional to the average of the A.C. voltage output from filter 22. Such unidirectional voltage is then compared with the voltage from a voltage reference source 38, the reference voltage being the proper value to provide the desired system output voltage. Such reference voltage from source 38 is suitably developed across a reference diode such as a Zener diode. The comparison of the unidirectional voltage and the reference voltage from source 38, conceptually depicted as being effected in element 40 provides a difference voltage which is applied to magnetic phase shifter 36, i.e., to the control winding of a magnetic amplifier or to a saturable inductor. Hence, changes in the control current in magnetic phase shifter 36 effect rapid and accurate control of the phase displacement between the output of master oscillator 24 and slave oscillator 26 and consequently, between the outputs of bridge inverters 16 and 18. Where magnetic phase shifter 36 is chosen to be a magnetic amplifier, there may be included a separate control winding in the magnetic amplifier which is shunted by a resistor and inductor to achieve "lag-lead" compensation of the frequency response characteristic of the magnetic amplifier. Such resistor and inductor are so designed as to optimize transient response of the total system of FIG. 1 to input line voltage fluctuations as well as abrupt output load changes.

Referring now to FIGS. 2–4, the polyphase input power supply to the system, again for convenience of explanation is shown to have three phases equally displaced in phase with respect to each other. The frequency and voltage of the input may be randomly variable and there may be any number of phases.

The polyphase inputs are passed through low pass filters 42, 44 and 46. Filter 42 comprises a series connected inductor 48 and parallel connected capacitors 50 and 52, filter 44 comprises a series connected inductor 54 and parallel connected capacitors 56 and 58 and filter 46 comprises a series connected inductor 60 and parallel connected capacitors 62 and 64.

The outputs of filters 42, 44 and 46 are applied to the three phase full wave high power rectifier 10. Rectifier 10 comprises a first portion 66 which comprises a series arrangement of diodes 68 and 70 in shunt with a series arrangement of a resistor 72, a capacitor 74, a resistor 76 and a capacitor 78, the junction 75 of capacitor 74 and resistor 76 being connected to the junction 69 of the cathode of diode 68 and the anode of diode 70.

A second portion 80 of rectifier 10 comprises the series connected diodes 82 and 84 in shunt with the series arrangement of a resistor 86, a capacitor 88, a resistor 90 and a capacitor 92, the junction 89 of capacitor 88 and resistor 90 being connected to the junction 83 of the cathode of diode 82 and the anode of diode 84.

A third portion 94 of rectifier 10 comprises the series connected diodes 96 and 98 in shunt with the series arrangement of a resistor 100, a capacitor 102, a resistor 104, and a capacitor 106, the junction 103 of capacitor 102 and resistor 104 being connected to the junction 97 of the cathode of diode 96 and the anode of diode 98.

The output of rectifier 10 is passed through smoothing filter 12 comprising a series connected choke coil 108 and a parallel connected capacitor 110 to provide at junction 109, a relatively smooth, unregulated, unidirectional potential. The L to C ratio of choke 108 and capacitor 110 is chosen to be relatively small to minimize voltage transients due to the step changes in the load of the output of the system.

A portion of the A.C. input to rectifier 10 is applied to primary winding 114 of low power transformer 28, primary winding 114 being connected between junctions 89 and 97. The voltage appearing at the midpoint of secondary winding 116 is developed across a resistor 118 and then passed through a filter comprising a series connected choke 120 and a parallel connected capacitor 122.

The filtered voltage appearing at the junction 121 of choke 120 and capacitor 122 is developed across the series arrangement of a resistor 124 and the cathode to anode path of a reference diode 126 (Zener, for example) and is also developed across a parallel connected variable resistor 128. The value of resistor 124 is so chosen whereby the voltage across reference diode 126 has the desired value for the input supply voltage to master and slave oscillators 24 and 26.

Connected between the junction 125 of resistor 124 and Zener diode 126 and a point 129 on resistor 128 is a control winding 130 of magnetic amplifier 30. Magnetic amplifier 30 comprises one gate winding 132 connected to terminal 115 of secondary winding 116 and connected in series with the cathode to anode path of a diode 134 and another gate winding 136 connected to terminal 112 of secondary winding 116 and connected in series with the cathode to anode path of a diode 138, diodes 134 and 138 serving to provide amplistat gain in magnetic amplifier 30.

The polarity dot designations on control winding 130 and gate windings 132 and 136 of magnetic amplifier 30 indicate the direction of current flow therethrough to produce positive ampere turns therein. Accordingly, it is seen that in the event that the voltage at junction 125 exceeds the voltage at point 129 on resistor 128, the direcion of current through control winding 130 is such as to increase the output of magnetic amplifier 30 whereby the average voltage developed across resistor 118 is increased and in the event that voltage at point 129 exceeds the voltage at junction 125, the direction of current through control winding 130 is such as to decrease the output of magnetic amplifier 30 whereby the average voltage developed across resistor 118 is decreased. Isolated control winding 140 in series arrangement with variable resistor 142 is a second control winding for magnetic amplifier 30. Control winding 140 functions to slow the operation of magnetic amplifier 30 and to filter the voltage sensed on control winding 130 whereby there is well-damped voltage regulation in response to transients. It is accordingly seen that magnetic amplifier 30 functions to provide a regulated D.C. voltage for oscillators 24 and 26. Diode 150 functions to negatively clamp the voltage appearing at point 152 to the voltage appearing at point 146, and diode 144 functions to decouple the voltage across diode 150 from magnetic amplifier 30.

As will be further explained hereinbelow, master oscillator 24 does comprise and slave oscillator 26 may comprise a saturable autotransformer. The saturable autotransformer for master oscillator 24, for example, comprises two identical cores. A winding 156 thereof encompases one of the cores and a winding 158 encompases the other of the cores. The twin cores of saturable transformer 154 are taped together respectively with the windings 156 and 158 thereon as described. The other windings of saturable transformer 154, i.e., the primary and secondary windings thereof are wound around the taped combination.

Considering the operation of windings 156 and 158, when the regulated D.C. voltage appearing at point 121 is passed through the operating coil of relay K and simultaneously passed through normally closed contacts K1 associated therewith, due to the polarities of windings 156 and 158 respectively, as shown by the designating polarity dots thereon, the current flowing in the same direction through windings 156 and 158, control winding 249 of a magnetic amplifier 230 and resistor 166 orients the core material of the two cores of transformer 154 in opposite directions. Such opposite orientation effectively presets oscillator 24 to an initial condition as will be further explained hereinbelow.

After the operating coil of relay K is energized, normally closed contacts $K_1$, associated therewith assume the open position and normally open contacts K2 associated therewith assume the closed position whereby the regulated D.C. voltage supply from point 121 can be applied to master and slave oscillators 24 and 26 through diode 168, a filter capacitor 170 being provided from point 164 to the negative terminal of the D.C. supply.

Master oscillator 24 comprises a first transistor 172 having an emitter 174 directly connected to the positive terminal (i.e., point 164) of the regulated D.C. voltage supply, a collector 176 connected to the negative terminal 146 of the regulated D.C. supply through a primary winding 180 of transformer 154, the emitter being connected to the junction 181 of the negative terminal 146 of the D.C. supply and junction 181 through the series arrangement of resistors 177 and 178, and a base 176 connected to the junction 179 of resistors 177 and 178 through a secondary winding 182 of transformer 154.

A second transistor 190 in oscillator 24 has its emitter 192 connected to emitter 174, its collector 194 connected to junction 181 through a primary winding 186 of transformer 154 and a base 196 connected to junction 179 through a secondary winding 184 of transformer 154. As has been aforestated, transformer 154 is of the saturable type and may suitably be an autotransformer, the core material therein preferably being of a grain oriented magnetic material having a given volt-second characteristic, i.e., the product of the voltage applied thereto and the time required for the cores thereof to go from saturation in one direction to saturation in the opposite direction.

Slave oscillator 26 is essentially similar to master oscillator 24 and accordingly, is also a magnetic coupled square wave multivibrator. However, the transformer 162 in slave oscillator 24 need not be of saturable type. If it is of the saturable type, then the volt-second characteristic of its core material has to be greater than that of transformer 154 as will be further explained.

In slave oscillator 26, a first transistor 200 has its emitter 202 connected to positive terminal 164 of the regulated D.C. supply, its collector 204 connected to negative terminal 146 of the D.C. supply through a primary winding 208 of transformer 162, emitter 202 being connected to the junction 209 of negative terminal 146 of the D.C. supply and primary winding 208 through the series arrangement of resistors 216 and 218, and a base 206 connected to the junction 217 of resistors 216 and 218, through a secondary winding 212 of transformer 162.

A second transistor 220 in slave oscillator 26 has its emitter 222 connected to emitter 202, its base 226 connected to junction 217 through a secondary winding 214 of transformer 162 and its collector 224 connected to junction 209 through a primary winding 210 of transformer 162.

A twin cored magnetic amplifier 230 which is an embodiment of the magnetic phase shifter 36 of FIG. 1 comprises gate windings 232 and 234 having their respective terminals 233 and 237 connected together, the junction 236 of windings 232 and 234 being connected to base 226 of transistor 220, the other terminals 231 and 235 respectively of gate windings 212 and 234 having connected therebetween the anode to cathode paths of diodes 238 and 240. The non-polarity dot terminal of a secondary winding 185 of transformer 154 is connected to junction 239 of the cathode of diode 238 and the anode of diode 240 and the polarity dot terminal of secondary winding 185 is connected to base 206 of transistor 200. A control winding 242 of magnetic amplifier 230 is connected in the output voltage sensing circuit, there being developed thereacross an error voltage which results from the comparison between the output voltage of the system and a reference voltage of a desired value. Control winding 244 of magnetic amplifier 154 in series arrangement with a resistor 246 is an isolated control winding which has the dual function of slowing the operation of magnetic amplifier 230 and filtering the voltage sensed on control winding 242 whereby there is provided a well damped voltage regulator response to transients, the operation of winding 244 being similar to the operation of winding 140 in magnetic amplifier 30.

Considering the operation of master oscillator 24 and slave oscillator 26 in conjunction with magnetic amplifier 230 including control winding 242, normally in the operation of a multivibrator such as that comprising transistors 172 and 190 and saturable transformer 154, transistors 172 and 190 alternately apply the voltage from the D.C. supply, i.e., from points 164 and 146, to primary windings 180 and 186 of transformer 154. Upon the application of such voltage, the voltage divider comprising resistors 177 and 178 biases the base to emitter junctions of both transistors 172 and 190 in such a direction as to render them both conductive. However, any small unbalance causes one transistor to become conductive before the other. If it is assumed that transistor 172 is rendered conductive first, the polarity of winding 182 is such that when transistor 172 conducts, the positive voltage applied at the nonpolarity dot terminal of winding 182 induces a negative voltage at base 176 with respect to the junction 179, thereby increasing the conductivity in transistor 172 and holding it conductive until transformer 154 saturates a constant number of volt-seconds later. While transistor 172 is so biased in the conductive direction, it is to be noted that the reverse polarity occurring in winding 184 is biasing transistor 190 further in the nonconductive direction. When transformer 154 saturates after transistor 172 has been conductive, the base drive on transistor 172 collapses and transistor 190 is substantially immediately rendered conductive. In this manner, transistor 190 supplies the other half of the output cycle of the multivibrator.

In the event that transformer 162 is a saturable transformer, the multivibrator comprising transistors 200 and 220 by itself operates in the same manner as described in connection with the multivibrator comprising transistors 172 and 190. The volt-second characteristic of transformer 162 in the event that it is chosen to be of the saturable type, has to be greater than the volt-second characteristic of transformer 154, whereby the natural frequency of slave oscillator 26 is less than that of master oscillator 24.

Now considering the operation of both oscillators 24 and 26 and the magnetic amplifier 230 coupling therebetween, it is seen that outputs of transistors 172 and 190 of master oscillator 24 are applied to gate windings 232 and 234 respectively of magnetic amplifier 230 through secondary winding 185. The control voltage derived from the comparison between the system output voltage and the reference voltage is generated on control winding 242. The polarity dots on the windings of magnetic amplifier 230 indicate the direction of current therethrough to produce positive ampere turns therein and thereby increase the output of the magnetic amplifier.

If it is assumed that transistor 172 of master oscillator 24 and transistor 220 of slave oscillator 26 are concurrently conducting, it is seen that current from the nonpolarity dot terminal of secondary winding 185 is passed through diode 240 and through gate winding 232 to base 206 of transistor 220. Dependent upon the volt-second characteristic of the core material of magnetic amplifier 230, when magnetic amplifier 230 saturates due to the current through winding 232, the sudden drop in the impedance of winding 232 and the consequent rise in potential at base 226 rapidly renders transistor 220 nonconductive and by transformer action, transistor 200 is consequently rapidly rendered conductive.

It has been stated above that transformer 154 is of the saturable type but that transformer 162 may be of the unsaturable type. If transformer 162 is chosen to be of the saturable type, it has to have an $NAB_s$ product which is appreciably greater than the $NAB_s$ product of transformer 154, the difference being about 25 percent. The natural frequency of slave oscillator 26 is consequently appreciably less than that of master oscillator 24. The volt-second characteristic of the core material of magnetic amplifier 230 and the error voltage generated on control winding 242 determines the amount of phase displacement between the outputs of oscillator 24 and oscillator 26.

It is to be further noted that core material of magnetic amplifier 230 has to be chosen to have a volt-second characteristic whereby its time of switching from saturation in one direction to saturation in the other direction cannot exceed the time of a half cycle of output from oscillator 24. If its volt-second characteristic were so chosen whereby its saturation time could be longer than the period of such half cycle, then in the event, of course, that transformer 162 were chosen to be of the saturable type, the frequency of the output of oscillator 26 would be its natural frequency as determined by the volt-second characteristic of transformer 162 and the value of the regulated D.C. supply voltage. In this type situation, oscillator 24 could not control the output frequency of oscillator 26.

Accordingly, with the arrangement of master oscillator 24, slave oscillator 26 and the magnetic amplifier 230 coupling therebetween, the phase difference permitted between the outputs of oscillator 24 and oscillator 26 is up to a maximum of 180°. It is, of course, appreciated that if volt-second characteristic of transformer 162, in the event that it were chosen to be of the saturable type, were equal to or less than the volt-second characteristic of transformer 154, oscillator 26 would have a natural output frequency independent of the frequency of oscillator 24. If magnetic amplifier 230 were eliminated from the circuit, and transformer 162 were either of the nonsaturable type or of the saturable type and having a greater volt-second characteristic than that of transformer 154, the output of oscillator 26 would be in synchronism with the output of oscillator 24 with no phase difference between the outputs. Diodes 238 and 240 effect high "amplistat gain" in magnetic amplifier 230.

The arrangement comprising oscillators 24 and 26 and magnetic amplifier 230 is characterized by several inherent advantages. For example, one advantage resides in the fact that very low power is required from the phase shift signal control source, i.e., the voltage across control winding 242, due to the high "amplistat gain" of magnetic amplifier 230. Another advantage is that control winding 242 can be designed to "match" a very wide range of signal source impedances. A further advantage is that the phase displacement between the outputs of master oscillator 24 and slave oscillator 26 can be made to be the algebraic sum of several control signals by merely winding several separate control windings on magnetic amplifier 230.

In bridge inverter 16, there is connected between junction 109 wherein the D.C. power input appears and ground, a series arrangement of an inductor 250 and the parallel combination of the series arrangements of silicon controlled rectifiers 252 and 254 and silicon controlled rectifiers 256 and 258 respectively. Connected between the junction 253 of the cathode of silicon controlled rectifier 252 and the gate electrode of silicon controlled rectifier 252 is the series arrangement of a secondary winding 260 of transformer 154 and a resistor 262. Connected between the cathode and the gate electrode of silicon controlled rectifier 254 is the series arrangement of a secondary winding 264 of transformer 154 and a resistor 266.

Connected between the junction 257 of the cathode of silicon controlled rectifier 256 and the gate electrode of silicon controlled rectifier 256 is the series arrangement of a secondary winding 268 of transformer 154 and a resistor 270. Connected between the cathode and the gate electrode of silicon controlled rectifier 258 is the series arrangement of a secondary winding 272 of transformer 154 and a resistor 274.

Connected between junctions 253 and 257 is the primary winding 278 of an output transformer 276, primary winding 278 being connected in shunt with a commutating capacitor 282. Connected between the anode of silicon controlled rectifier 252 and ground is the series arrangement of the cathode to anode paths of diodes 284 and 286, an inductor 291 being connected between junction 253 and the junction 285 of the anode of diode 284 and the cathode of diode 286. Connected between the anode of silicon controlled rectifier 256 and ground is the series arrangement of the cathode to anode paths of diodes 288 and 290, an inductor 292 being connected between junction 257 and the junction 289 of the anode of diode 288 and the cathode of diode 290.

In the operation of bridge inverter 16, it is seen by the designating polarity dots of secondary windings 260, 264, 268 and 272 that silicon controlled rectifiers 252 and 258, and silicon controlled rectifiers 254 and 256 are respectively rendered substantially simultaneously conductive.

If it is assumed that silicon controlled rectifiers 252 and 258 are first rendered conductive by the supplying of positive current to their gate electrodes through secondary windings 260 and 272 and through resistors 262 and 274 respectively, most of the voltage appearing at junction 109 appears across primary winding 278. Such conduction continues for the duration of the half cycle of output from master oscillator 24. Upon the initiation of the next half cycle of output from master oscillator 24 whereby the positive current appears in secondary windings 264 and 268, capacitor 282 which has been charged during the preceding half cycle is abruptly connected across silicon controlled rectifiers 252 and 258 in the reverse polarity, thereby quickly causing silicon controlled rectifiers 252 and 258 to cease conducting and to recover their blocking states respectively. The reverse polarity voltage is applied to silicon controlled recifiers 252 and 258 at a rate which is determined partly by the load current which is flowing through primary winding 278 and partly by the series resonant combination of inductors 291 and 292 and capacitor 282. Conduction now continues in silicon controlled rectifiers 254 and 256 and the half cycle of opposite polarity of output is obtained across primary winding 278, etc. Diodes 284 and 286 and diodes 288 and 290 are included to permit the returns of energy to the source, i.e., point 109, in conditions such as those of lagging power factor loads, i.e., inductive loads when circulating reactive currents are present. Inductor 250 is included to limit the current surge at the time that commutation occurs from one pair of silicon controlled rectifiers to the other pair of silicon controlled rectifiers.

Bridge inverter 18 is identical to bridge inverter 16 both in structure and in operation. The transformer windings in circuit with the gate electrodes of silicon controlled rectifiers of bridge inverter 18 are secondary windings of transformer 162 in slave oscillator 26 and accordingly the output of bridge inverter 18 appearing across the primary winding 302 of an output transformer 300 is displaced in phase with respect to the output appearing across primary winding 278 of transformer 276, the same amount as is the displacement in phase between the outputs of slave oscillator 26 and master oscillator 24.

It is to be noted that in master and slave oscillators 24 and 26 that transistors 176 and 220 are simultaneously conductive for the period that it takes magnetic amplifier 230 to saturate whereupon conductivity is switched from transistor 220 to transistor 200. Similarly, transistors 190 and 200 are simultaneously conductively for the period that it takes magnetic amplifier 230 to saturate at which time conductivity is switched to transistor 220. Accordingly, in bridge inverter 16, silicon controlled rectifiers 252 and 258 are conductive when transistor 172 conducts and silicon controlled rectifiers 256 and 254 are conductive when transistor 190 conducts. Likewise, in bridge inverter 18, silicon controlled rectifiers 294 and 299 conduct when transistor 200 is conductive and silicon controlled rectifiers 298 and 296 are conductive when transistor 220 is conductive. Thus, the polarities of secondary windings 280 and 304 of output transformers 276 and 300 respectively are such as to provide the proper phasor additions of half cycles of like polarity in the outputs of bridge inverters 16 and 18.

The output filter comprises a series arrangement of a capacitor 306 and a saturable inductor 308 and a parallel arrangement of a capacitor 310 and the inductance of that portion 311 of saturable transformer 312 between terminal 305 and ground. Capacitor 306 and inductor 308 are tuned to series resonance at the frequency of the outputs of oscillators 24 and 26, i.e., the desired fundamental output frequency and capacitor 310 and inductance 311 are tuned to parallel resonance at the same frequency. Inductor 308 presents a high impedance to higher harmonics as compared to the impedance presented by capacitors 306 and 310, and, therefore, has most of the harmonics dropped across it. Capacitor 310 supplies energy to the output during the portion of the cycle when bridge inverters 16 and 18 are not enabled. Inductor 308 is chosen to be of a saturable type and provides a form of current limiting. Thus, if the current through inductor 308 exceeds a certain value, it saturates at each half cycle, thereby detuning the LC circuit comprising capacitor 306 and inductor 308 and thus dropping much of the fundamental, i.e., the desired output across it.

The output appearing at point 305 is developed across a saturable transformer 312 which is tapped to ground at about its two-third point. A portion of the output voltage appearing across transformer 312 is full-wave rectified by diodes 314 and 316 and this rectified voltage is applied to the parallel combination comprising a variable resistor 318 and the series arrangement of the cathode to anode path of a reference Zener diode and a reistor 322, the control winding 242 of magnetic amplifier 230 being connected between the junction 321 of diode 320 and resistor 322 and a point 317 on resistor 318.

It is seen that when the voltage at point 323 is of the proper value, there is substantially no voltage developed across control winding 242. When the voltage at point 323 is below the proper value, the voltage developed on winding 242 is in amplitude and polarity such that there is provided increased output from magnetic amplifier 230 and the phase difference between the outputs of oscillators 24 and 26 and consequently between the outputs of inverters 16 and 18 is decreased. When the voltage at point 323 exceeds the desired value, the voltage appearing at point 321 effects the development of an error voltage on winding 242 in a polarity such as to decrease the output of magnetic amplifier 230 and thereby to widen the phase displacement between the respective oscillators 24 and 26 and bridge inverters 16 and 18. In this manner the A.C. output voltage of the system is regulated.

It is to be noted that the voltage appearing at point 321 is not purely a direct current voltage but is a direct current voltage with a small slice taken out of it each half cycle due to the nature of the voltage waveform applied. With such arrangement, there is desirably regulated substantially the R.M.S. output voltage rather than the average voltage.

The functions of transformer 312 are to provide a suitable means for full wave center tapped sensing as applied to diodes 314 and 316. Also, under transient high voltage conditions, transformer 312 saturates, thereby limiting the average output voltage and causing such voltage to return to its normal level faster than it would normally so do, thereby providing voltage clamping action.

It has been stated above that initially the twin cores of transformer 154 are respectively orientated in opposite directions. It is thus understood that in master oscillator 24, whichever transistor 172 or 190 is energized into conduction first, determines the polarity of first output pulse of oscillator 24. However, regardless of polarity, the duration of the first output pulse of oscillator 24 is only 90 electrical degrees due to the fact that one of the cores of transformer 154 is already at saturation.

In effect, therefore, one half of the magnetic circuit in oscillator 24 is not present during the first half cycle and therefore the duration of the first half cycle of output of oscillator 154 is only 90 electrical degrees. Each subsequent half cycle of output from oscillator 154 is the normal 180 electrical degrees.

The significance of initially orienting the cores of transformer 154 in opposite directions of orientation when power is applied to the system can now be appreciated. Transformers 276 and 300 of bridge inverters 16 and 18 represent a very high proportion of the total weight of the system (about 50%, depending upon the output frequency). For this reason, it is desirable to minimize the needed NA, or product of winding turns times effective iron area in these output transformers. Transformers 276 and 300 are suitably designed with a small air gap and, therefore, the flux states thereof respectively at the start of the initial cycle of operation are close to zero. If the first part cycle is only a quarter cycle long, i.e., 90 electrical degrees, then the respective fluxes in transformers 278 and 300 reach a maximum flux density condition, say, at state B. If the next half cycle thereafter is normal, i.e., 180 electrical degrees, the flux is switched in each transformer to the state, —B. With succeeding half cycles, the flux states of the transformers continue to swing between states —B and +B, etc., and not from zero to 2B as in the case of an ordinary circuit. For this reason, it is highly desirable to have the first half cycle of operation only one quarter cycle long, such being accomplished as previously explained. Since on the first part cycle, regardless of which transistor first conducts in oscillator 24, as one core of saturable transformer 154 is already saturated, the effective required iron areas in the inverter output transformers 276 and 300 respectively are cut in half.

In order to insure that no commutation failure can occur at start-up and to insure that the first part cycle of the output of slave oscillator 26 does not exceed 90 electrical degrees, there is included the circuit 399 connected between base 196 of transistor 190 and base 226 of transistor 220. This circuit includes the series arrangement of the anode to cathode path of a diode 400, a resistor 402, the cathode to anode path of a diode 404 and a resistor 406. The junction 403 of resistor 402 and the cathode of diode 404 is connected to point 146 (the negative terminal of the regulated D.C. supply) through the parallel combination of a capacitor 408 and a resistor 410.

In the operation of circuit 399 when current is passed through windings 156 and 158 of transformer 154 and the control winding 249 of magnetic amplifier 230, the polarity of winding 249 is such that magnetic amplifier 230 is saturated during the initial start-up transient. Diode 400, resistor 402 and resistor 410 insure that transistor 190 in master oscillator 24 is the first to be rendered conductive and resistors 406 and 410 and diode 404 insure that transistor 220 is the first to be rendered conductive in slave oscillator 26. With this arrangement at start-up, silicon controlled rectifiers 252 and 258 in bridge inverter 16 and silicon controlled rectifiers 294 and 299 in bridge inverter 18 are also substantially simultaneously first rendered conductive.

The polarity of primary winding 302 of output transformer 300 as shown by the designating polarity dot thereon is chosen such that at the initial start-up transient, minimum voltage occurs at the output terminals of the system, i.e., the phasor sum of the voltage in secondary windings 276 and 304. This can be understood when it is realized that since initially the voltage outputs of master and slave oscillators 24 and 26 and consequently the outputs of inverters 16 and 18 are in unison due to the action of control winding 249 and start-up circuit 399, the polarities of windings 276 and 304 are such that the voltages appearing therein oppose each other. After the first part cycle, the voltage across control winding 242 of magnetic amplifier at first is of an amplitude and polarity such as to maintain a gradually decreasing output from magnetic amplifier 230 whereby a phase difference develops between the outputs of oscillators 24 and 26 and the phasor sum of the voltages in windings 276 and 304 gradually increases. With this arrangement the system output voltage builds up smoothly until the desired output voltage and transient overshoot of the output voltage during initial start-up is substantially eliminated.

Figure 6:
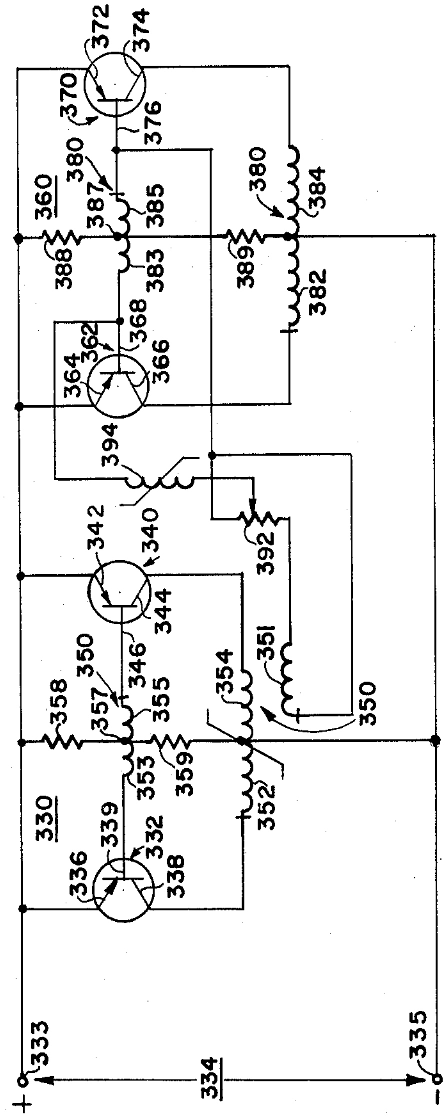
FIG. 6 is a schematic diagram of another embodiment of the master-slave oscillator combination shown in FIG. 1 and FIGS. 2–4.

In FIG. 6, there is shown another embodiment of an arrangement comprising a master-slave oscillator with a magnetic phase shifter coupling therebetween. In this figure, there is shown a first magnetic coupled multivibrator 330 comprising transistors 332 and 340 and a saturable transformer 350 and a second magnetic coupled multivibrator comprising transistors 362 and 370 and a transformer 380. Multivibrator 330 has a natural frequency which is the desired frequency. The output of multivibrator 360 is synchronized with and displaced in phase from the output of the multivibrator 330.

In multivibrator 330, transistor 332 has its emitter 336 connected to the positive terminal 333 of a unidirectional potential source 334 and its collector 338 connected to the negative terminal 335 of source 334 through a primary winding 352 of saturable transformer 350. The base 339 of transistor 332 is connected to positive terminal 333 through a secondary winding 353 of transformer 350 and a resistor 358 and is connected to negative terminal 335 through a resistor 359.

The other transistor 340 of the multivibrator 330 has its emitter 342 directly connected to terminal 333, its collector 344 connected to negative terminal 335 through a primary winding 354 of transformer 350, and its base 346 connected to junction 357 through a secondary winding 355. Saturable transformer 350 may suitably be an autotransformer and comprises a core preferably of a grain oriented magnetic metal having a given volt-second characteristic.

Multivibrator 360 is essentially similar to the multivibrator 330 except that transformer 380 therein need not be of a saturable type, i.e., its core need not be of a grain oriented material. If it is of the saturable type, then, of course, its volt-second characteristic has to be greater than transformer 350 in multivibrator 330, a suitable difference in such volt-second characteristic being about 25 percent as has been explained above. With such difference when transformer 380 is of the saturable type, then the natural frequency of multivibrator 360 is less than that of multivibrator 330.

In multivibrator 360, transistor 362 has its emitter 364 connected to positive terminal 333, its collector 366 connected to negative terminal 335 through a primary winding 382 of transformer 380 and its base 368 connected to positive terminal 333 through a secondary winding 383 of transformer 380 and a resistor 388, and connected to negative terminal 335 through a resistor 389. Transistor 370 has its emitter 372 directly connected to positive terminal 333, its collector 374 connected to negative terminal 335 through a primary winding 384 of transformer 380 and its base 376 connected to junction 387 through a secondary winding 385 of transformer 380.

A secondary winding 351 of transformer 350 has its polarity dot terminal connected to base 376 of transistor 370 and its other terminal connected to base 368 of transistor 362 through a variable resistor 392 and a saturable reactor 394. The designating polarity dots on the windings of transformers 350 and 380 show the direction of current flow therethrough to produce positive ampere turns therein.

Considering the operation of multivibrators 330 and 360 of FIG. 6 and the coupling therebetween comprising secondary winding 351, variable resistor 392 and saturable reactor 394, if it is assumed that transistors 332 and 370 are conductive, that the voltages at the polarity dot terminals of the windings of transformer 350 are positive and that the voltages at polarity dot terminals of the windings of transformer 380 are negative, in such situation, it is seen that the entire voltage across secondary windings 383 and 385 of transformer 380 is added to a portion of the voltage in secondary winding 351 of transformer 380, such portion being determined by the value of the portion of variable resistor 392, and the combination of these two voltages is applied to saturable reactor 394. If it is assumed that initially inductor 394 is at "negative saturation," i.e., its magnetic flux is so oriented as to require exciting current flow therethrough in the direction from base 368 to variable resistor 392, a fixed predictable time elapses before reactor 394 abruptly saturates in accordance with the following equation:

$$\Delta t=\frac{2NAB_s\times 10^{-8}}{E}\text{second}$$

wherein N is the amount of turns on reactor 394, A is the effective iron area in square inches in reactor 394, $B_S$ is the saturation flux density in lines per square inch in reactor 394, and E is the total voltage applied to reactor 394.

At the instant that reactor 394 saturates, the potential at base 368 goes rapidly in the negative direction to switch transistor 360 into conductivity and the opposite half cycle of output from multivibrator 360 is produced.

Since transformer 380 is either of the unsaturable type or if of the saturable type is chosen to have an $NAB_s$ product which is appreciably greater than the $NAB_s$ product of transformer 350, the switching period of multivibrator 360 is determined by the volt-second characteristic of reactor 394 and the voltage applied thereto as determined in part by the value of the portion of resistor 392. The volt-second characteristic of inductor 394 consequently determines the amount of phase displacement between the output of multivibrator 330 and the output of multivibrator 360.

It is to be noted that reactor 394 has to be chosen to have a volt-second characteristic such that its time of switching from saturation in one direction to saturation in the opposite direction cannot exceed the time of a half cycle of output from multivibrator 330 as has been previously explained in connection with magnetic amplifier 230 in FIGS. 2–4. If its volt-second characteristic is chosen such that its saturation time might be longer than the period of such half cycle of output from multivibrator 330, then, of course, the frequency of the output of multivibrator 360 in the event that transformer 380 were of the saturable type would be its natural frequency as determined by the volt-second characteristic of transformer 380 and the value of potential source 334. In this latter type situation, multivibrator 330 could not control the output frequency of multivibrator 360. Accordingly, with the arrangement of the circuit of FIG. 6, the phase difference permitted between the outputs of both multivibrators is up to a maximum 180°.

It is, of course, further to be noted that if the volt-second characteristic of transformer 380, in the event that it were saturable were equal to or less than the volt-second characteristic of transformer 350, multivibrator 360 would have its natural output frequency independent of the frequency of the output of multivibrator 330. If saturable reactor 394 were eliminated from the circuit and if transformer 380 were either of the unsaturable type or the saturable type and having a greater volt-second characteristic than transformer 350, the output of multivibrator 360 would be in synchronism with the output of multivibrator 330 with no phase difference therebetween.

Resistor 392 may be utilized to vary the volt-second capabilities of saturable reactor 394 whereby its time of saturation may range from a minimal period to a period equal to the time of a half cycle of output from multivibrator 330.

In the graph of FIG. 8, the abscissa is control current in milliamperes and the ordinates are phase displacement in electrical degrees. The data for the graph is obtained from the operation of the portion of the circuit of FIGS. 2–4, which includes oscillators 24 and 26 and magnetic amplifier 230. The outputs of oscillator 26, FIGS. 2–4 and multivibrator 360 in FIG. 6 have been found to be substantially distortion free.

A combination such as that comprising master oscillator 24, and slave oscillator 26 and magnetic amplifier 230 shown in FIGS. 2–4 or a combination such as that of multivibrators 330 and 360 and saturable reactor 394 shown in FIG. 6 provide arrangements whereby there may be produced a plurality of rectangular wave signals which are displaced in phase with respect to each other for varying amounts. These combinations may accordingly be used advantageously for controlling the output voltage of an inverter system by connecting the outputs of the two inverters in series arrangement and controlling the total output voltage therefrom by phase shifting the output of one inverter with respect to the other. Such combinations overcome the disadvantage of a resistance-capacitance phase shift circuit in that the output wave-form is not distorted and smooth control of such phase shifting is readily attained automatically.

In addition, a resistance-capacitance phase shift network does not enable smooth phase shifting and generally requires the need of the intervention of an operator to vary a resistance or a capacitance by suitable manual means to effect the change in phase shift.

In FIG. 7, there is shown an application of a circuit comprising a master oscillator, a slave oscillator and a magnetic phase shifter coupling therebetween to effect voltage regulation of a static inverter circuit or the serially combined outputs a plurality of two static inverter circuits.

In this circuit, the input power source 410 which may be a unidirectional potential source is applied to a voltage regulator 412 and is also applied to a power switching stage 414 and a power switching stage 416. Oscillators 418 and 420 which are magnetic coupled multivibrators such as oscillators 24 and 26 in FIGS. 2–4 provide the square wave switching voltages for power switching stages 414 and 416 respectively. The capacitors 418C and 420C serve to provide relatively rapid switching of conductivity in one transistor to the other transistor in oscillators 418 and 420 respectively thereby aiding in providing sharp, rectangular wave outputs therefrom.

The output of voltage regulator 412 is also applied to an isolation amplifier 419 comprising a transistor 422 and a transistor 432. In the latter circuit, transistor 422 has its emitter 424 connected to the positive terminal of the output from regulator 412 and its collector 426 connected to the negative terminal of regulator 412 through a primary winding 442 of a transformer 440. The base 428 is connected to the junction 430 of emitter 424 and the positive terminal of voltage regulator 412 through the series arrangement of a secondary winding 418 $TS_1$ of transformer 418T in oscillator 418 and a resistor 431.

Transistor 432 has its emitter 434 connected to junction 430, its base 438 connected to junction 430 through the series arrangement of a secondary winding 418 $TS_2$ of transformer 418T and a resistor 441 and its collector 436 connected to the junction 443 of winding 442 of transformer 440 and the negative terminal of voltage regulator 412 through a primary winding 444 winding of transformer 440. The anode to cathode path of a diode 429 is provided connected between collector 426 and emitter 424 of transistor 422 and the anode to cathode path of a diode 439 is provided connected between collector 436 and emitter 434 of transistor 432.

In the operation of the isolation amplifier comprising transistors 422 and 432 and their associated circuit components, it is seen by the designating polarity dots on secondary windings 418 $TS_1$ and 418 $TS_2$ of transformer 418T, that bases 428 and 438 are alternately driven in the negative direction in accordance with the switching into conductivity of transistors 418A and 418B of oscillator 418. Accordingly, isolation amplifier 419 provides an output which is in exact synchronism with the output of oscillator 418 with no phase displacement between their respective outputs. Diodes 429 and 439 are included to provide transient suppression in accordance with well known practices.

Power switching stages 414 and 416 may suitably contain devices such as silicon controlled rectifiers which are rendered alternately conductive in accordance with the square wave voltages applied thereto from oscillators 418 and 420 respectively whereby there is provided at the outputs of stages 414 and 416, square wave outputs in accordance with the outputs of oscillators 418 and 420.

A combining network and filter stage 450 may suitably comprise means for serially combining the outputs of power switching stages 414 and 416, such combining means suitably being secondary windings of respective output transformers in the power switching stages 414 and 416 connected in series and the filter portion of stage 450 may suitably be a low pass filter for converting the combined quasi rectangular wave outputs to a relatively pure sinusoidal form. The output of the circuit is taken from combining network and filter stage 450.

Such output is applied to a comparison network 452, the comparison network comprising two parallel arms. One parallel arm comprises the series arrangement of a resistor 455 and the cathode to anode path of a reference diode 454 such as a Zener diode, the anode of diode 454 being connected to neutral and the other parallel arm comprises a series arrangement of a resistor 456 and a variable resistor 458. Across diode 454 there is developed the proper voltage against which the output voltage is referenced.

A control winding 462 of a self-saturating magnetic amplifier 460, i.e., an "amplistat," has its polarity dot terminal 461 connected to the cathode of reference diode 454 and its other terminal connected by means of a tap to a point 463 on variable resistor 458, there being developed on control winding 462 a voltage which is the difference between the output voltage of stage 450 and the voltage across reference diode 454. Control winding 462 encompasses both cores of twin core magnetic amplifier 460, amplifier 460 also comprising gate windings 464 and 466. Terminals 465 and 467 of gate windings 464 and 466 respectively are connected together, the junction thereof being connected to the base of transistor 420B in the oscillator 420. The other terminals respectively of gate windings 464 and 466 are connected through the anode to cathode path of a diode 468 and the anode to cathode path of a diode 470, the junction 469 of the cathode of diode 468 and the anode of diode 470 being connected to the base of transistor 420A through a secondary winding 446 of transformer 440.

In considering the operation of the system of FIG. 7, it is seen that the difference voltage developed on control winding 462 is the phase shift control signal for oscillator 420. Winding 446 serves as a combining means for the voltage appearing across windings 442 and 444 in isolation amplifier 419 and the voltage provided from magnetic amplifier 460. Accordingly, it is seen that the output of oscillator 420 is synchronized frequency wise with the output of oscillator 418, but that its output is displaced in phase with respect to the ouput of oscillator 418 depending upon he volt-second characteristic of magnetic amplifier 460 and the amplitude of the control signal applied to control winding 462. Thus, in the event that the difference voltage developed on control winding 462 in the positive ampere turns direction is a relatively large one whereby the phase displacement between the outputs of oscillators 418 and 420 and, consequently, the outputs of power switching stages 414 and 416 are relatively small, the output of combining network 450 will be correspondingly increased as a consequence thereof and vice versa. It is to be realized that the maximum phase displacement between the outputs of oscillators 418 and 420 cannot exceed 180°.

Figure 5:
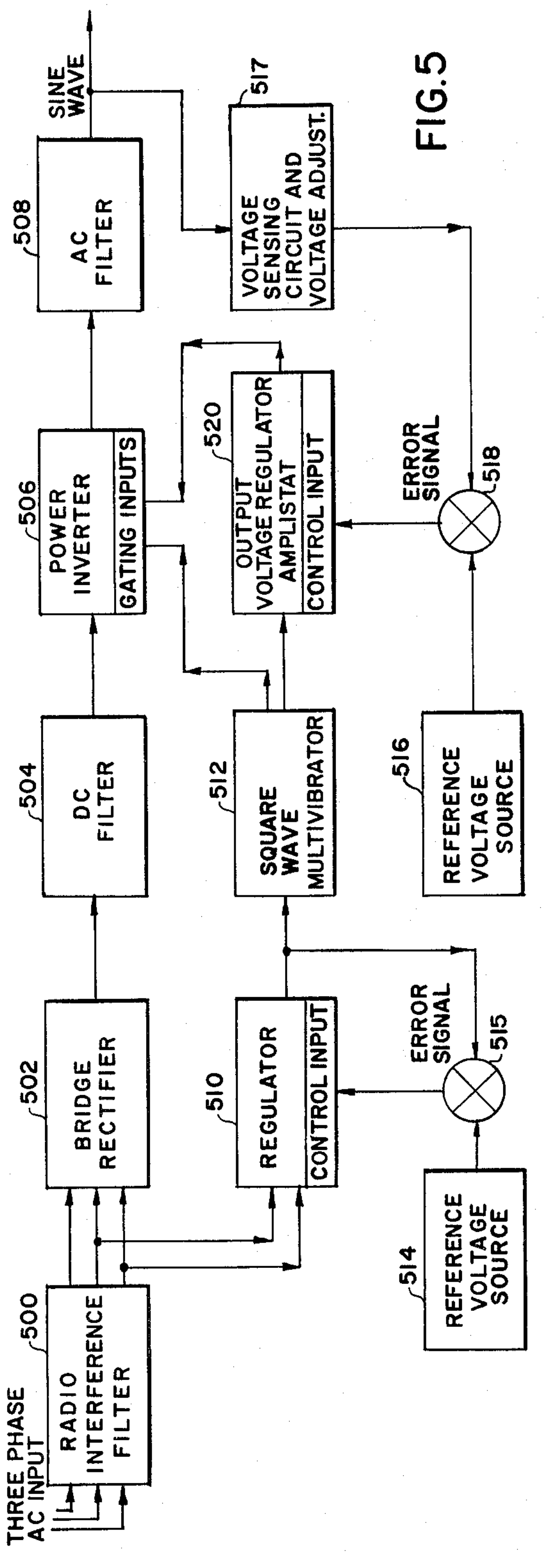
FIG. 5 is a block diagram of another embodiment of a frequency converter according to the invention.

In FIG. 5 wherein there is shown another illustrative embodiment of a frequency changer in accordance with the principles of the invention, a multiple phase input such as a three phase input which is randomly variable in voltage and frequency is passed through a low pass filter 500. Filter 500 serves to prevent radio interference generated by the bridge rectifier 502 from flowing back into the input power source and to filter any random high voltage "spikes" which may occur in the alternating current power supplied to bridge rectifier 502 to thereby eliminate the possibility of rectifier damage which might result otherwise from random input transients.

The output of filter 500 is rectifier in bridge rectifier 502 directly without the use of an input transformer. Rectifier 502 may suitably comprise a three phase "double-way" bridge rectifier wherein steady state voltage ratings are selected such as to permit safe operation during transients up to a chosen value R.M.S. line to neutral.

The output of bridge rectifier 502 is filtered in a D.C. filter 504, filter 504 suitably being an LC choke input filter which smooths the output from bridge rectifier 502 to eliminate voltage modulations of the output of the system. The L to C ratio in filter 504 is chosen to be small to minimize voltage transients due to step changes in the output load of the system.

The smooth but unregulated output from the filter 504 is applied to a power inverter circuit 506. This circuit contains switching devices such as high current silicon controlled rectifiers in a bridge inverter connection. Circuit 506 may also contain silicon controlled rectifiers for controlling its output voltage, such control being enabled by the effecting of independent control of commutation of the high current silicon controlled rectifiers. Power inverter circuit 506 may also contain commutation components comprising capacitors and inductors which provide resonant discharge paths so that the commutation interval between the high current, i.e., the load carrying, silicon controlled rectifiers is essentially independent of the electrical load on the system. These inductors may be tapped in a manner such that the charge stored in the commutating capacitors is a function of load current whereby commutation efficiency is high both for very light and heavy loads.

There may also be included in power inverter circuit 506, "pump back" rectifiers, i.e., rectifiers which are utilized to prevent commutation failures due to reactive loads and which form part of the commutation circuit, these rectifiers also permitting the flow of energy from the A.C. load back to the D.C. supply as may be required for lagging power factors. The frequency of the output of power inverter circuit 506 is controlled by a square wave voltage having the desired frequency of the output of the system and which is applied to stage 506 together with the D.C. power output from filter 504.

The output voltage waveform as seen across, for example, an output voltage transformer included in stage 506 consists of alternating square pulses of relatively constant amplitude, and whose widths depend upon the periods of conduction of the high current silicon controlled rectifiers. Such waveform may be designated a "quasi square wave."

The output of power inverter circuit 506 is filtered in A.C. filter stage 508. Filter 508 is suitably of the so-called fourth order type as previously hereinabove described in connection with the system of FIGS. 1–4 and provides a sine wave output.

The output of radio interference filter stage 500 is also applied to a regulator 510 which provides a regulated relatively low power D.C. power supply for a square wave multivibrator 512. Regulator 510 may suitably be a self-saturating magnetic amplifier, i.e., an "amplistat," comprising a plurality of gate windings and a plurality of control windings. One of these control windings has applied thereto a D.C. signal which controls the amplitude of the output of regulator 510, i.e., a unidirectional potential which substantially has the value desired for the D.C. supply for the square wave multivibrator 512. A reference voltage of the proper value may be developed across a Zener reference diode in reference voltage source 514 and such reference voltage is compared with the output of regulator 510 in stage 515, the error signal resulting from such comparison providing the control signal for the control winding in the magnetic amplifier of regulator 510 whereby there is produced at the output of 510, a regulated D.C. supply for square wave multivibrator 512.

Square wave multivibrator 512 is suitably a multivibrator whose output frequency is a function of its supply voltage and may be a magnetic coupled multivibrator. The frequency of multivibrator 512 is chosen to be the desired output frequency of the system. The output of multivibrator 512 is applied as an input to power inverter stage 506 to provide gating signals for the high current silicon controlled rectifiers therein. The gating circuits associated with the silicon controlled rectifiers of power inverter 506 are designed whereby a negative gate bias voltage is applied to all of the silicon controlled rectifiers except when positive gating pulses are actually being supplied thereby eliminating any possibility of "false triggering" such as may occur with gating circuits which are not designed to provide negative bias.

The output voltage provided from A.C. filter 508 is applied to a voltage sensing and voltage adjusting circuit 517. In circuit 517, the output voltage is rectified to obtain a D.C. voltage whose value is proportional to the average of the A.C. voltage at the output of filter 508. Such D.C. voltage is then compard, as depicted in element 518, with the voltage developed across a Zener reference diode in reference voltage source 516. Any difference, i.e., error voltage generated as a consequence of such comparison is applied to a control winding of an output voltage regulator amplistat 520. Amplistat 520 controls the gating signals to the voltage regulating silicon controlled recifiers in power inverter 506 such that control current changes in amplistat 520 results in rapid and accurate control of the quasi-square wave output of power inverter 506. Thereby, there is regulated the voltage of the sine wave output of filter 508. Amplistat 520 may also contain a separate control winding shunted by resistor and inductor to achieve "lag-lead" compensation of the frequency response characteristic of the amplistat. The resistor and inductor in series with such control winding is so designed as to optimize transient response of the system to input line voltage fluctuation, i.e., the input to radio interference filter 500, as well as to abrupt output load changes.

While there have been shown particular embodiments of this invention, it will, of course, be understood that it is not wished to be limited thereto since different modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. In combination with a power source for producing a polyphase output having a randomly variable voltage and frequency, polyphase rectifying means in circuit with said source for converting said polyphase output to a single substantially unidirectional power signal, power switching means, an oscillator having a chosen frequency, means in circuit with said power source for deriving a unidirectional voltage of a given value therefrom, means for applying said unidirectional voltage as a supply voltage to said oscillator, means for applying said unidirectional power signal and the output of said oscillator to said power switching means to produce a single phase power output having said chosen frequency, a reference voltage source, means in circuit with said power switching means and said reference voltage source for comparing the voltage of said single phase power output with said reference voltage to produce a difference voltage therebetween, and means for applying said difference voltage as an error voltage to said power switching means.

2. In combination with a power source for producing a polyphase output having a randomly variable frequency and voltage, polyphase rectifying means in circuit with said polyphase source for converting said polyphase output to a single substantially unidirectional power signal, power switching means comprising first and second power inverters connected in bridge arrangement, first and second oscillators, means in circuit with said power source for driving a unidirectional voltage of a given value therefrom, means for applying said unidirectional voltage to said first and second oscillators respectively, phase shifting means for coupling the output of said first oscillator to the input of said second oscillator to produce outputs from said first and second oscillators having the same frequency but being displaced in phase with respect to each other an amount in accordance with a voltage applied to said phase shifting means, means for applying the output of said first oscillator and said single phase power signal as inputs to said first power inverter to produce an output from said first inverter having the frequency and being in phase with the output of said first oscillator, means for applying said single phase power signal and the output of said second oscillator to said second power inverter to produce a power output from said second inverter having the frequency and being in phase with the output of said second oscillator, means in circuit with the output of said inverters for vectorially combining the outputs therefrom, a reference voltage source, means in circuit with said last named source and said combining means for comparing the voltage of said combining means output with said reference voltage to produce a difference voltage therebetween, and means for applying said difference voltage to said phase shifter.

3. In combination with a power source for producing a polyphase output having a randomly variable voltage and frequency, polyphase rectifying means in circuit with said polyphase source for converting said polyphase output to a single substantially unidirectional power signal, power switching means comprising first and second power inverters, means in circuit with said power source for deriving a unidirectional voltage of a given value therefrom, a first reference voltage source, means in circuit with said deriving means and said first voltage source for comparing said derived voltage with said reference voltage to produce a first difference voltage therebetween, means for applying said first difference voltage to said deriving means to produce a regulated unidirectional derived voltage having a chosen value, a first magnetic coupled multivibrator comprising a saturable transformer having a given volt-second characteristic, means for applying said regulated derived voltage as a supply voltage to said first multivibrator to produce an output from said first multivibrator having a frequency which is the function of the magnitude of said derived voltage and said volt-second characteristic, a second magnetic coupled multivibrator, means for applying said regulated derived voltage as a supply voltage to said second multivibrator, magnetic phase shifting means for applying the output of said first multivibrator as a driving signal to said second multivibrator to produce an output from said second multivibrator having the frequency of the output of the first multivibrator but displaced in phase therefrom, said magnetic phase shifting means comprising means having a prescribed volt-second characteristic and which is saturable in a period which is a function of said volt-second characteristic and magnitude of a voltage applied thereto, means for applying the output of said first multivibrator and said unidirectional power signal to said first power inverter to produce an output therefrom having the frequency of said multivibrators and in phase with the output of said first multivibrator, means for applying the output of said second multivibrator and said unidirectional power signal to said second power inverter to produce an output therefrom having the frequency of said multivibrators and displaced in phase with respect to the output of said first power inverter the same amount as the phase displacement between said first and second multivibrators, means in circuit with said power inverters to vectorially combine the outputs therefrom, a second reference voltage source, means in circuit with said combining means and said second source for comparing the voltage of the output of said combining means with said second reference voltage to produce a second difference voltage therebetween, and means for applying said second voltage as the voltage for said magnetic phase shifter.

4. In combination with a power source for producing a polyphase output having a randomly variable frequency and voltage, polyphase rectifying means in circuit with said polyphase source for converting said polyphase output to a single substantially unidirectional power signal, power switching means comprising first and second power inverters, means in circuit with said power source for deriving a voltage therefrom, a magnetic amplifier comprising control and gate means, means for applying said derived voltage to said gate means, a first reference voltage source, means in circuit with said magnetic amplifier and said first source for comparing the voltage output from said magnetic amplifier with said first reference voltage to provide a first difference voltage therebetween, means for applying said first difference voltage to said control means to produce a regulated voltage at the output of said magnetic amplifier, a first magnetic coupled multivibrator comprising a saturable transformer having a prescribed volt-second characteristic, means for applying said regulated voltage to said first multivibrator to produce an output therefrom having a frequency in accordance with the amplitude of the said regulated voltage and said volt-second characteristics, a second magnetic coupled multivibrator, magnetic phase shifting means for applying the output of said first multivibrator as a driving signal to said second multivibrator to produce an output from said second multivibrator having the frequency of said first multivibrator but displaced in phase therefrom, said magnetic phase shifting means comprising saturable means having a predetermined volt-second characteristic whereby said magnetic phase shifting means is saturable in a period which is in accordance with its volt-second characteristic and a voltage applied thereto, means for applying the output of said first multivibrator and said unidirectional power signal as inputs to said first power inverter to produce a power output therefrom having the frequency of said multivibrators, means for applying the output of said second multivibrator and said unidirectional power signal to said second power inverter to produce an output therefrom having the frequency of said multivibrators but displaced in phase with respect to the output of said first power inverter the same as the displacement in phase between the outputs of first and second multivibrators, means for vectorially combining the outputs of said power inverters, filter means in circuit with the output of said combining means for substantially removing therefrom components having a frequency other than the frequency of said multivibrator outputs, a second reference voltage source, means in circuit with said second voltage source and said filter means for comparing the voltage of the output of said filter means with said second reference voltage to derive a second difference voltage therebetween, and means for applying said second difference voltage as the voltage for said magnetic phase shifting means.

5. In the combination defined in claim 4 wherein means are included for deriving said second reference voltage from the output of said combining means.

6. In the combination defined in claim 4 wherein said magnetic phase shifting means comprises a saturable reactor coupling said first and second multivibrators.

7. In the combination defined in claim 4 wherein said magnetic phase shifting means comprises a magnetic amplifier having gate means coupling said first and second multivibrators and control means, said second difference voltage being applied to said last named control means.

8. In the combination defined in claim 7 wherein each of said power inverters comprises an output transformer and wherein the saturable transformer of said first oscillator comprises a pair of like cores, a first winding around one of said cores in one polarity, a second winding around the other of said cores in the opposite polarity, a plurality of primary and secondary windings encompassing both of said cores and means for initially applying said regulated voltage to said first and second windings whereby said cores are initially saturated in opposite directions, there thereby being produced initially from said first oscillator, a part cycle which is less than 180 electrical degrees.

9. In the combination defined in claim 8 wherein said magnetic amplifier of said magnetic phase shifting means includes first control means to which said second difference voltage is applied and second control means, said second control means being so poled whereby said magnetic phase shifting means is initially saturated, and wherein each of said multivibrators comprises a pair of active devices which are conductive during alternate half cycles, said combination further including means in circuit with a chosen active device of each of said oscillators respectively for insuring that said chosen active devices are the first to be rendered conductive to produce outputs from said first and second multivibrators which are initially in phase.

10. In the combination defined in claim 4 wherein each of said power inverters comprise a pair of inverter elements in bridge arrangement.

11. In the combination defined in claim 10 wherein each of said power inverter elements comprise first and second silicon controlled rectifiers, each of said silicon controlled rectifiers being alternately gated into conductivity in response to a half cycle of output of the same polarity from a multivibrator, a first silicon controlled rectifier of one power inverter element and a second silicon controlled rectifier of the other power inverter element being substantially simultaneously rendered conductive.

12. In the combination defined in claim 4 wherein said filter means comprises a first series combination, tuned to said frequency, of a first capacitor and a first saturable inductor in series arrangement with the output of said combining means and a second parallel combination, tuned to said frequency, of a second capacitor and a second saturable inductor connected in parallel with the output of said combining means, said saturable inductors saturating at chosen current levels to detune said resonant combinations.

13. In the combination defined in claim 12 wherein said filter means further includes a saturable output transformer, a portion of which is said second inductor, and across which the output of said filter means is developed, said last named transformer saturating at overvoltages.

14. In the combination with a power source for producing a polyphase output having a randomly variable voltage and frequency, polyphase rectifying means in circuit with said polyphase source for converting said polyphase output to a single substantially unidirectional power signal, power switching means, means for deriving a voltage from said polyphase output, a first magnetic amplifier comprising first control and first gate means, means for applying said derived voltage to said gate means, a first reference voltage source, means in circuit with said first source and said first magnetic amplifier for comparing the output of said first magnetic amplifier with said first reference voltage to provide a first difference voltage therebetween, means for applying said first difference voltage to said first control means to provide at the output of said first magnetic amplifier a regulated derived voltage, a magnetic coupled multivibrator comprising a saturable transformer having a given volt-second characteristic, means for applying said regulated derived voltage as a supply voltage to said multivibrator to produce a square wave having a frequency which is in accordance with the amplitude of said derived voltage and said volt-second characteristic, means for applying the output of said multivibrator and said power signal to said power switching means to produce a power output having the frequency of said multivibrator, filter means in circuit with said power switching means for substantially removing from the output thereof components other than those having the frequency of said multivibrator, a second reference voltage source, means in circuit with said second source and said filter means for comparing the voltage of the output of said filter means with said second reference voltage to derive a second difference voltage therebetween, a second magnetic amplifier comprising second gate and second control means, means for applying the output of said multivibrator to said second gate means and for applying said second difference voltage to said second control means to provide an output from said second magnetic amplifier which is in accordance with said second difference voltage, and means for applying the output of said second magnetic amplifier to said power switching means as an error voltage.

15. In the combination defined in claim 14 wherein said filter means includes a series connected first saturable inductor and a first capacitor in series arrangement with the output of said power switching means and a parallel connected second capacitor and a second saturable inductor connected across the output of said power switching means, said inductors and capacitors being respectively tuned to the frequency of said multivibrator, said inductors saturating when the current in said power switching means output exceeds a predetermined value.

16. In the combination defined in claim 15 wherein said filter means further includes a saturable output transformer, a portion of which is said second inductor, and across which the output of said filter means is developed, said saturable transformer saturating at overvoltages to thereby limit the periods and magnitudes of overvoltage transients.

17. In combination, a source of rectangular wave voltage having a natural frequency, a rectangular wave oscillator, gate means which is switched from the substantially nonconductive to the substantially conductive state in response to the volt-seconds applied thereto, the time required for such switching being a factor of the magnitude of said applied volt-seconds, and means for applying said rectangular wave voltage as a driving signal to said oscillator through said gate means to produce an output from said oscillator having said frequency, the output of said oscillator being displaced in phase with respect to the phase of said source voltage in accordance with said time required.

18. The combination defined in claim 17 wherein said source comprises a pair of like active devices and magnetic means for coupling the respective outputs from each of said devices to the inputs of the other of said devices, said coupling means comprising a first saturable transformer having a predetermined volt-second characteristic whereby said natural frequency of the output of said source is a function of said characteristic.

19. The combination defined in claim 18 wherein said oscillator comprises a pair of active devices and means for coupling the outputs of each of said respective devices to the inputs of the other devices, said coupling means comprising a second transformer.

20. The combination defined in claim 19 wherein said second transformer is saturable and has a volt-second characteristic which is greater than said volt-second characteristic of said first transformer whereby said natural frequency of said source is greater than the natural frequency of said oscillator.

21. In combination, a first rectangular wave oscillator comprising a pair of first active devices, a saturable transformer for coupling the outputs of each of said devices respectively to the inputs of the other devices, said transformer having a chosen volt-second characteristic whereby the natural frequency of said first oscillator is a function of said characteristic, a second rectangular wave oscillator comprising a pair of second active devices and means for coupling the outputs of each of said second devices respectively to the inputs of the other devices, a magnetic amplifier comprising control winding means and gate winding means coupling said oscillators, said magnetic amplifier having a given volt-second characteristic, an electric signal source in circuit arrangement with said control winding, and means for applying the output of said first oscillator to said second oscillator through said magnetic amplifier as a driving signal for said second oscillator to produce an output from said second oscillator having the frequency of the output of said first oscillator, said output of said second oscillator being displaced in phase with respect to the output of said first oscillator an amount which is proportional to the volt-second characteristic of said magnetic amplifier and the magnitude of said control signal.

22. In the combination defined in claim 21 wherein the coupling means of said second oscillator comprises a transformer.

23. In the combination defined in claim 21, wherein the coupling means of said second oscillator comprises a saturable transformer having a volt-second characteristic which is greater than the volt-second characteristic of the saturable transformer in said first oscillator.

24. In the combination defined in claim 23 wherein said magnetic amplifier comprises two cores and wherein said gate winding means comprises two windings, each of said windings being in series arrangement with a rectifier, the junction of said rectifiers being coupled to the input of one of the active devices in said second oscillator, the junction of said windings being coupled to the input of the other of said devices in said second oscillator.

25. In an inverter wherein power from a unidirectional current source is converted into alternating current power of a chosen frequency, means for regulating the output voltage of said alternating current power comprising a first rectangular wave oscillator having said chosen frequency for controlling the frequency of the output of said inverter, said first oscillator comprising a pair of first active devices and saturable transformer means for coupling the respective outputs of said devices to each other, means for applying a voltage derived from said source as a supply voltage to said first oscillator, a second oscillator comprising a pair of second active devices and means for coupling the outputs of said devices respectively to the inputs of the other devices, means for applying said derived voltage as a supply voltage to said second oscillator, first and second power switching means, means for applying the output of said source to said first and second switching means, means for applying the output of said first and second oscillators to said first and second power switching means respectively, the outputs of said first and second power switching means being alternating current power outputs respectively having said chosen frequency, means for serially combining the outputs of said power switching means, means in circuit with the output of said last named combining means for deriving a voltage of a chosen value therefrom and for comparing the output voltage of said combining means with said derived voltage to produce a difference voltage therebetween, saturable switching means comprising control means and gate means, means for applying said difference voltage to said control means, means for applying the output of said first oscillator through said saturable switching means as a driving signal to said second oscillator, the outputs of said second oscillator and said second power switching means having said chosen frequency but being displaced in phase with respect to the outputs of said first oscillator and first power switching means an amount which is inverse to the magnitude of said difference voltage whereby the voltage of said output combining means is regulated.

References Cited by the Examiner

UNITED STATES PATENTS

| | | | |
|---|---|---|---|
| 2,875,351 | 2/1959 | Collins | 321—2 |
| 3,026,484 | 3/1962 | Bennett et al. | 331—113.1 |
| 3,031,629 | 4/1962 | Kadri | 331—113.1 |

LLOYD McCOLLUM, *Primary Examiner.*